United States Patent
Cantu et al.

[11] Patent Number: 6,056,239
[45] Date of Patent: May 2, 2000

[54] CONVERTIBLE SEATING AND SLEEPING ACCOMMODATIONS FOR AIRCRAFT

[75] Inventors: Carlos Martinez Celis Cantu; Mario Martinez Celis Greenham, both of Alondra 19 El Rosedal Coyoacan, Mexico City 04330, Mexico

[73] Assignees: Carlos Martinez Celis Cantu; Mario Martinez Celis Greenham; David Martinez Celis Greenham; Miguel Avalos Sartorio; Carlos Avalos Sartorio, all of, Mexico

[21] Appl. No.: 09/132,658

[22] Filed: Aug. 12, 1998

[51] Int. Cl.[7] .................................................. B64D 11/06
[52] U.S. Cl. ................................. 244/118.6; 244/122 R; 244/118.5; 297/344.13
[58] Field of Search .............................. 244/118.5, 118.6, 244/122 R; 297/344.13, 344.14

[56] References Cited

U.S. PATENT DOCUMENTS

| | | | |
|---|---|---|---|
| 4,589,612 | 5/1986 | Halim | 244/118.6 |
| 5,333,818 | 8/1994 | Brant et al. | 244/118.6 |
| 5,425,516 | 6/1995 | Daines | 244/118.6 |
| 5,716,026 | 2/1998 | Pascasio et al. | 244/118.6 |
| 5,740,989 | 4/1998 | Daines | 244/118.6 |
| 5,788,183 | 8/1998 | Marechal | 244/118.6 |
| 5,857,745 | 1/1999 | Matsumiya | 244/118.6 |

*Primary Examiner*—J. Woodrow Eldred
*Attorney, Agent, or Firm*—Dechert Price and Rhoads

[57] ABSTRACT

This invention relates to aircraft passenger accommodations which are easily and individually convertible from a sitting position to a reclining position. The accommodations provide privacy and security in single or double occupancy configurations.

13 Claims, 19 Drawing Sheets

CONVERTIBLE SEATING AND SLEEPING ACCOMMODATIONS FOR AIRCRAFT

This application claims benefit under 35 U.S.C. §119 to Mexican Industrial Design Registration No. 970,738, filed Aug. 13, 1997.

FIELD OF THE INVENTION

This invention relates to aircraft passenger accommodations which are easily and individually convertible from a sitting position to a reclining position. The accommodations provide privacy and security in single or double occupancy configurations.

BACKGROUND OF THE INVENTION

Sleeper accommodations in transportation are a well known concept that have been widely used on passenger trains, ships and also on aircraft. Nevertheless, the solutions that have been applied, for example on trains, solve the very specific needs existent for this type of vehicle through systems and operational procedures which usually involve complex and cumbersome procedures which require substantial interaction and cooperation of the passengers and the crew in order to perform needed spatial conversions. Concepts, designs and devices used in those contexts are far removed from the solutions presented in this invention.

Despite the differences between train systems and earlier aircraft sleeper accommodation, those earlier systems share a common feature; namely, they require a great deal of crew assistance and necessary passenger cooperation in order to carry out the conversion from seat to sleeper. These earlier systems relied on different technological solutions and fall short in the number of advantages offered by the invention presented herein. Furthermore, earlier systems have been also directed towards a very small, first-class group of air travelers due to the excess of space which those solutions require to provide convertible sleeper accommodations for each passenger.

Commercial aircraft have been constantly evolving in recent decades, attaining very large sizes and ever longer flight ranges. As this happens, passengers find themselves trapped in airplane passenger cabins for ten to fifteen hours at a time, spending full days or nights trying to sleep in a seat that offers little more than a partially reclinable back and at best a leg rest for certain business and first-class travelers. A full array of services has been created around this limitation, aimed at entertaining passengers as well and as long as possible, during long flights, offering everything from in-flight personal movies to unlimited free champagne. In spite of all this, there comes a time after several hours when the only thing most passengers want, and which they usually cannot do, is to lie down in a comfortable, totally horizontal position and fall asleep. Sometimes, business class passengers even go back to tourist class cabins looking for a row of empty seats where they can lie down and stretch out.

Another even more serious consequence of these standard-seat passenger cabin's limitations in regard to long flights, presents itself as a health hazard, as forced upright positions and lack of mobility over long periods of time are known to be a cause of cardiovascular problems among persons with a tendency to develop this type of health condition. At best, even for healthy people, sitting up for hours at a time with little opportunity to move and stretch leads to extreme exhaustion and may represent a potential risk to the later development of health problems related to inadequate flying conditions.

Furthermore, as the number of business travelers increases, more passengers than ever before find themselves stepping off an airplane after sitting awake on a night-long intercontinental flight only to board a taxi and head directly to business appointments after a quick stopover at their hotel. The lack of suitable sleeping accommodations on aircraft is an issue of heightened practical concern.

In recent years, the air transportation industry has been addressing this growing need by providing convertible sleeping accommodations in their first-class cabins comprising over-spaced seats that may recline to a 180° angle giving passengers the opportunity to lie down and rest during long flights. However, because of the space consumption of these alternatives, the cost, and resulting airfare prices, put this approach out of reach for practically all airlines and travelers.

As this need in commercial flying becomes more acute, the time has come to develop a solution that provides all intercontinental and long distance aircraft passengers with the advantage of sleeper accommodations and cabins which are designed in such a manner as to be attractive, comfortable, safe, easy to access and operate, with all the conveniences of modern flying. Above all, these accommodations are designed to permit a truly comfortable, totally reclined position for rest and sleep during flight, at affordable rates and airfare prices for the average air traveler.

An aircraft convertible sleeper cabin concept is presented here which fulfills these characteristics in a design that has the capability to be produced with the latest monocoque modular construction technology, that will permit carriers to convert standard seating passenger cabins in aircraft into advanced design convertible sleeper cabins, rapidly and cost-efficiently. The invention is also applicable for use in newly designed and built aircraft.

SUMMARY OF THE INVENTION

The present invention provides a space- and cost-efficient modular convertible sleeper passenger cabin system for the fitting or refitting of aircraft, including without limitation, wide-body, long flight range aircraft. The system comprises modular construction passenger units which contain a convertible "seat-bed" element based on an innovative fold-out system, which can be adjusted without crew assistance easily and independently by the passenger from a sitting position to a totally reclined, horizontal position, or any other position between those two end points. The seat-bed element may include an arm rest which becomes a safety rail when the seat-bed is in the reclining position. Modular passenger units may, for example, be double or single occupancy, according to each specific passenger cabin arrangement. The system may further comprise built-in hand baggage bin, sliding and/or detachable service table, video monitor, emergency oxygen masks, life vests, reading light, ventilation outlets, headphone jack, audio and video controls, seat-bed controls, flight attendant calling button, three-point seat belt and sliding "privacy" panel. The system may further comprise features such as telephone service, computer modem outlets and electrical outlets.

Each passenger unit or module is directly and independently accessible from the circulation aisle or aisles of the aircraft. In a preferred configuration, there are three circulation aisles. In most embodiments of the invention, to maximize capacity, there are more than one horizontal layer of passenger units; for example, the passenger units may be arranged above each other in three vertical levels for tourist class passenger cabins and in two levels for business class passenger cabins.

When there is more than one layer of such units, the passenger units located in middle and upper levels are safely and easily reached without crew assistance being necessary, by means of fixed, integrated ladders with a unique horizontally curved, obstruction-free ("wrap-around") design.

All passenger cabin arrangements present an open, roomy environment. They are suitable for providing appropriate seating and sleeping accommodations for most passengers, including passengers with age or other physical limitations or disabilities. Through various embodiments of the invention, there are specific cabin arrangements available for all types of aircraft, including without limitation, wide-body commercial aircraft in current operation or under design.

BRIEF DESCRIPTION OF THE DRAWINGS

The present invention, as to its construction and operation, may be understood by reference to the accompanying drawings, in which.

DETAILED DESCRIPTION OF THE INVENTION

Figure 1A:
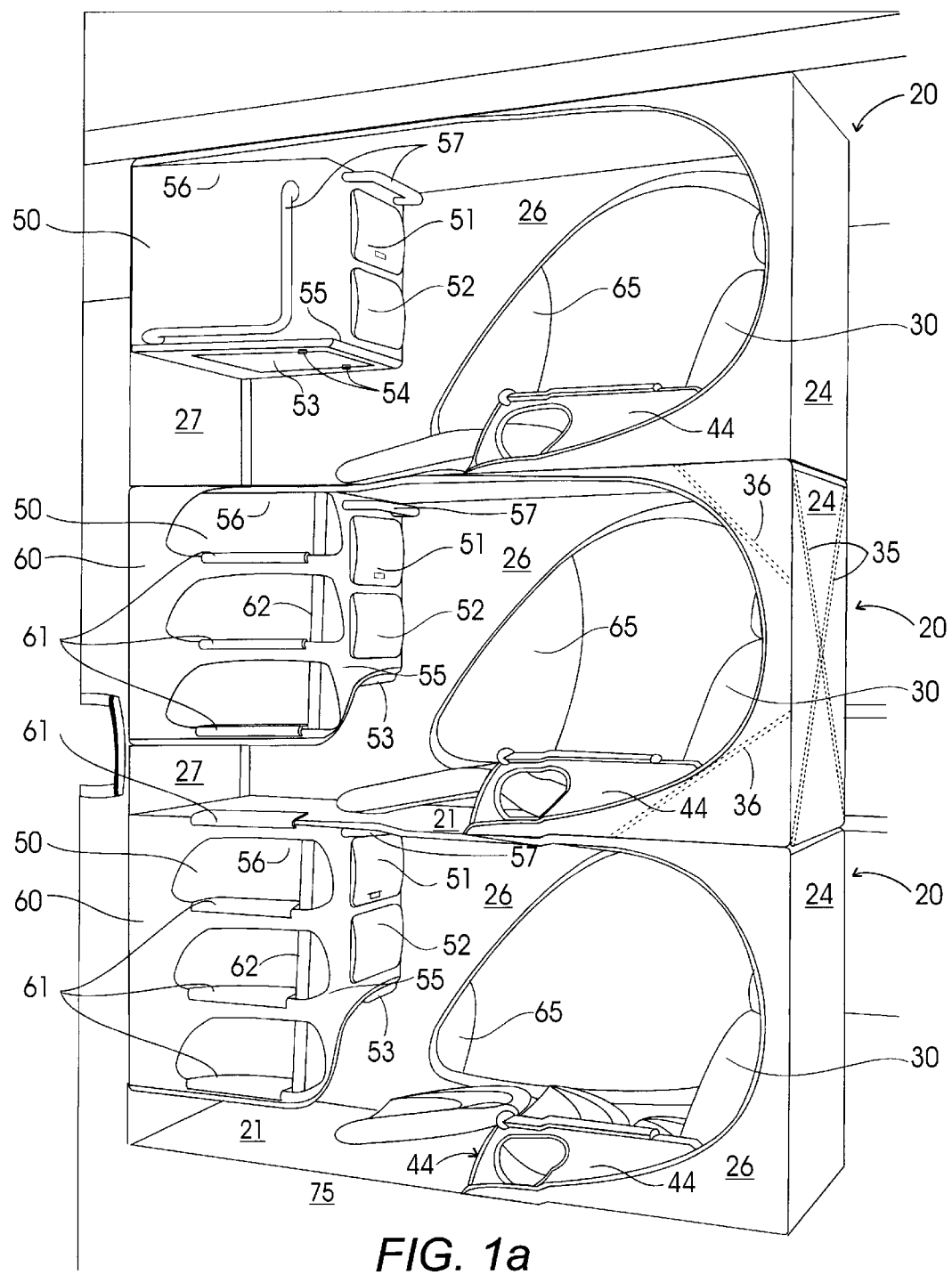
FIG. 1a is a perspective view of tourist class, modular single passenger units arranged in three levels.

The purpose of this invention is to present a detailed system which includes design, arrangement and operation of a modular, monocoque construction, convertible sleeper passenger cabin for aircraft which provides all the advantages described in the background section, and which is fit to be installed in new as well as in older aircraft of the wide-body type as a substitute for conventional seating systems used to this date in such aircraft.

An outstanding characteristic of this sleeper passenger cabin system is that of providing modular passenger units of monocoque construction which contain a "seat-bed" feature; this is, a seat element which can be readily converted into a bed independently from other seats in the cabin, at the will of the passenger occupying the module in a very easy manner and without crew assistance being necessary.

This seat-bed functional device comprises a jointed frame structure which provides support for padded elements which form the parts of the seat-bed: back support, seat cushion and leg rests. In both its upright seat position, and its extended bed position, the seat-bed remains fully contained within the confines of the modular unit.

The jointed-fame structure is preferably mounted on parallel sets of rollers and sliders, which are in turn connected to a set of parallel, vertical and horizontal sliding rails and slider guides. When powered by mechanical, electro-mechanical or pneumatic means, or otherwise, said jointed-frames fold in and out to adjust the seat-bed at precisely the desired position from a seated position with legs down toward the floor (e.g., in business class units), to seated with outstretched legs on a support (e.g., in tourist class units), to fully reclined at a 180° angle, and essentially all positions intermediate to those end points. Leg rest elements may also be lifted and lowered by mechanical, electromechanical or pneumatic means in order to provide leg support under the knees for a more comfortable posture when sitting. This seat-bed element also presents a secure three-point adjustable seat belt and an arm rest element which slides partially along with the joint-frames in order to become a safety rail when the seat-bed is positioned in the bed mode.

The invention comprises differing module configurations which may depend on the specific design and arrangement of passenger cabins in differing aircraft or the desired capacity of an aircraft. In various embodiments of the invention, there may be single-occupancy or double-occupancy module units or combinations thereof, to accommodate either one or two persons, each person occupying an individual seat-bed which can be operated independently. This feature makes possible for two persons traveling together, or for people traveling with children to share a modular compartment with a certain degree of privacy from other passengers in adjacent compartments. Nevertheless, double-occupancy passenger units are designed in such a manner that they may also be occupied comfortably by persons unrelated to each other.

Single-occupancy passenger units provide extra privacy for passengers traveling alone to be able to read, watch video programming, listen to music, work, or just rest and sleep comfortably reclined in a totally horizontal position.

Each modular passenger unit preferably includes a hand baggage bin which is built inside the passenger unit utilizing the available space above the passenger's legs and feet. This bin provides storage room for authorized hand baggage and personal items in an individual, closable container. A service table may preferably be integrated with the hand baggage bin element. For example, the unit may be designed such that the service table may be partially slid out from a storage place under or adjacent to the hand baggage bin in order to place objects such as books, laptop computers, beverage containers, personal items, etc. This service table may also be detached completely from its slider guides. If detachable, the service table preferably has foldable legs which can be unfolded to allow placement of the service table on the seat-bed, over or adjacent to the passenger.

The following comfort and safety features may also preferably be integrated into passenger unit, most preferably in conjunction with the hand baggage bin unit: video monitor, emergency oxygen masks, life vest, and safety hand grips to facilitate accessing or leaving the passenger unit.

In one preferred embodiment of the invention, each passenger unit is equipped with reading light, ventilation outlets, audio-video controls, seat-bed controls, headphone jacks, and flight attendant calling button. The inclusion of other or alternate safety and convenience features are also within the scope of the invention. All of these fixtures are preferably set at suitable places within easy reach of the passenger when in a sitting and/or supine position. An adequate degree of privacy from the passenger(s) occupying the adjacent compartments is attained by means of a light weight, rigid material forming a "privacy" sliding panel. When not in use, this panel can be slid completely out of the way and into a hiding slot between the inner lateral walls of two contiguous hand baggage bin units, contributing to create an open, roomy environment throughout the passenger cabin and at the same time avoiding to represent a potential obstruction hazard in case of an emergency. To the extent that adjacent unit are essentially mirror images of each other, the inner lateral walls of longitudinally adjacent passenger units will be side by side. This allows each person in a unit to independently control whether to have this panel open or closed.

The present invention comprises a passenger unit for an aircraft which comprises (a) at least one convertible seat-bed unit, (b) at least one convertible arm rest device, (c) at least one adjustable, three-point seat belt, (d) at least one baggage bin integrally constructed within the passenger unit, (e) a ladder element integrally constructed within the passenger unit to facilitate passenger access into and out of vertically adjacent passenger units in said aircraft, the ladder element of one passenger unit being vertically aligned with a ladder unit of a vertically adjacent passenger unit, (f) at least one set of controls to adjust lighting and ventilation in the unit, attendant call devices, and audio headphone jacks, and (g) an openable and closable portion of one longitudinal wall of the unit. In this passenger unit, the seat-bed unit may be configured or adjusted by a passenger, independent of the configuration of other seat-bed units in the passenger unit or in other passenger units of the aircraft, in a continuous series of positions from an essentially upright position to an essentially flat position, wherein the seat-bed unit, in any configuration, does not extend outside of the passenger unit.

The arm rest device converts to a side rail restraint when the seat-bed unit is converted from an upright position to a flat position. The openable and closable portion in a wall of the unit may be a retractable panel situated in that wall. Preferably, the seat-bed unit and the arm rest device are mounted on a jointed frame device which is longitudinally movable backward and forward, such that the seat-bed unit is converted from an essentially upright position to an essentially flat position, and the arm rest device is simultaneously converted to a side rail, as the jointed frame device is moved from a back position to a forward position.

The arrangement solution of these modular passenger units inside an aircraft passenger cabin is another outstanding feature of this system. In a preferred embodiment, it is based on a design which presents three longitudinal aisles which run through the cabin to provide direct and independent access to every passenger unit module in the cabin. All the passengers units are positioned longitudinally, facing forward and set above each other at both sides of each of the three aisles. Tourist class passenger cabin arrangements present three levels of passenger units. Business class cabin arrangements present two levels of passenger units which are larger in the vertical dimension in order to provide extra space for passengers feet when seat-bed is positioned in the seat mode.

In an embodiment of the invention, the invention comprises an aircraft comprising one or more rows of the passenger units as described herein, where the units are aligned along a longitudinal axis of the aircraft, and there is at least one aisle adjacent to the row of passenger units. The aircraft may comprise four rows of passenger units and three aisles, where two rows are contiguous with an external wall of the aircraft, and two rows are situated along interior longitudinal axes of the aircraft. In this configuration, the interior rows of passenger units may each comprise two contiguous, longitudinally parallel rows of units, such that each unit in an interior row is adjacent to another unit in that same row and shares a common wall with the adjacent unit. In this embodiment, there may be at least one retractable panel in that common wall; preferably, each of the adjacent units has its own retractable panel in the common wall.

The aircraft of this invention may comprise passenger units of differing dimension. For example, there may be units of a first size (business class units) and of a second size (tourist class unit), where the first size unit is higher than the second size unit, and the first size units may be arranged vertically in one or two levels and the second size units may be arranged vertically in one, two or three levels. Preferably, the units have the same overall length and width so that they can be stacked vertically without regard to their "class" designation. The larger, first size units provide, inter alia, more legroom for the passenger occupant beneath the baggage bin of the unit.

Passenger units located at the lateral ends of the cabin, next to the windows, are set on a single level, at standard seat height, generally 38 to 45 cm. These passenger units always present the vertical dimension used for business class passenger units, and they are particularly suited for use, for example, by senior or physically disabled passengers. Closed compartments for extra storage space in the cabin are located above these preferential passenger units, adjacently to the walls of the passenger cabin.

Another significant feature presented in this system are fixed ladders, which are integrated to each vertical set of passenger units at the foot end of the lateral sides of the modular units, these ladders feature a "wrap around", non-obstructive, horizontally curved, slightly tilted design, and their vertical elements are interrupted at the bottom of each unit to provide extra space for passengers' feet and leg movement when entering or leaving the unit. This integrated ladder permits occupants of middle and upper level passenger unit modules to enter and exit their modules easily, safely and independently, without disturbing other passengers and without crew assistance being necessary. Hand grips are provided at strategic places to permit a natural, effortless body motion when entering or leaving the passenger unit.

Lavatories, as well as food and beverage dispensing facilities, are also provided within the passenger cabin, in sufficient quantity as to adequately service all passengers. It is also possible to include self-service snack and beverage facilities, because the convertible sleeper cabin system permits passengers to leave and return to their units more freely than conventional seating systems.

This system of convertible sleeper cabin design also presents precise arrangement solutions for tourist class, as well as for business class passenger cabins, for all types of wide-body commercial aircraft presently in operation.

The FIGS. 1–13 depict various embodiments of the invention. It is understood that the invention is not limited to the embodiments shown in the figures, which are merely illustrative of the invention. The numbering used in the figures is consistent throughout to indicate features of the invention.

A passenger unit 20 of modular, structural monocoque construction, is shown in various forms in FIGS. 1–13. The passenger unit 20 comprises an essentially orthogonal compartment comprising a seat-bed 30, an armrest/side rail 44, a hand baggage bin unit 50, and such features as a slidable, detachable service table or tables 53, oxygen mask compartment 55, life vest 56 (storage location identified; object not shown), and suitably positioned lighting elements 71, ventilation outlets 72, and appropriately situated headphone jack, audio-visual controls, lighting controls and seat-bed controls 73, to allow for convenient use by the passenger. The passenger units 20 contain an integrated ladder element 60. The ladder element 60 of vertically adjacent passenger units 20 may differ in configuration. For example, as shown in FIGS. 1a and 1b, the bottom and intermediate passenger units have integrated therein footholds or rung of the ladder element 60, while the top passenger unit has no additional rungs, but has handholds 57.

Figure 1B:
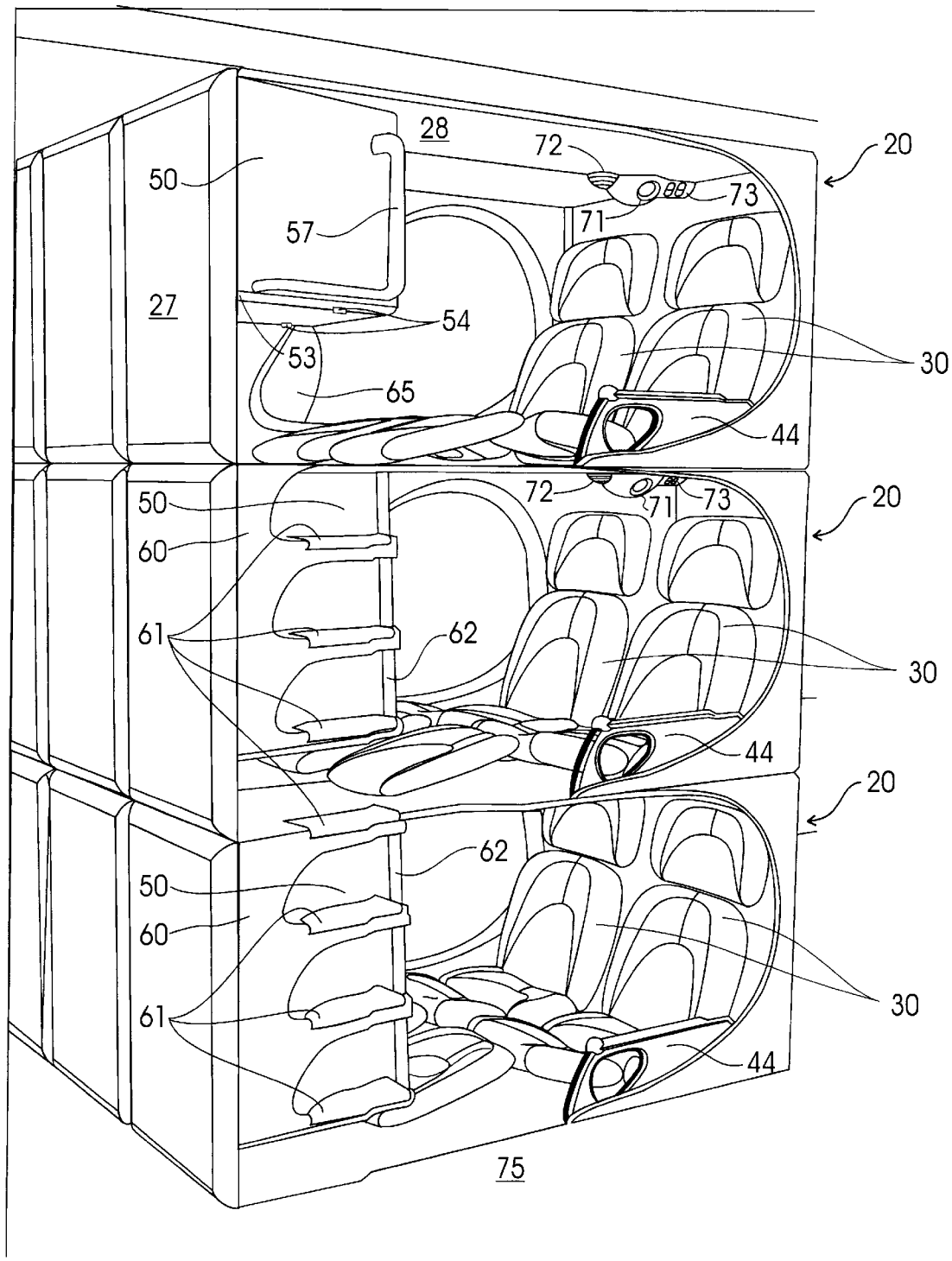
FIG. 1b is a perspective view of tourist class modular double passenger units arranged in three level.

The modular passenger units 20 of the invention are preferably built with monocoque technology, made of lightweight, rigid structural engineering plastics and engineering composites, comprising panels to close the bottom and back end side of the units and panels which partially close both lateral sides of the unit, according to the design shown in FIGS. 1a and 1b. These panels are reinforced at critical stress points with metal elements as follows: The bottom panel 21 is reinforced by horizontal U-section metal rails 45 which support the jointed frame device 40. Additional reinforcement is provided to this panel by the metal slider guides 46 which support the leg rest sections 33 of the jointed frame/seat-bed assembly. The back end side panel 24 is reinforced by the vertical U-section metal rails 45 which also support the outer end of the jointed frame section 47 which corresponds to the back support element 31 of the seat-bed 30 system.

Additional metal elements 35 set in a diagonal position (FIG. 1a) link the bottom end of each U-section vertical rail 45 with the top end of the other, contributing to a more solid, non-deformable structure in this panel.

In a similar manner, metal elements 36 set in a diagonal position link the vertical U-section rail 45 with the horizontal U-section metal rail 45 on each side of the passenger unit 20 providing structural strength to each of the lateral side panels 26 of the unit and also increasing the structural strength of the wall units against deformation; that is, attaining a more rigid structure by creating triangular structural elements in the same manner as described above for the back end side panel.

Each unit's top panel and front end panel are correspondingly formed by the bottom panel and by the back end panel of adjacent units when assemblies are made to accommodate units according to specific cabin arrangements. Passenger units located at the top or at the front end of a unit arrangement, are provided with special reinforced top panels 28 or front panels 27 as shown in FIG. 1b, in order to complete the walls of the units and also to complete the structural system of that specific unit arrangement.

Assembly and anchoring elements 37 (FIGS. 5, 6 and 7) of each passenger unit in the form, for example, of nuts and bolts, and/or specifically designed conventional fasteners for use on aircraft, are utilized at the bottom back corners, at the bottom front corners and at the top back corners of the unit, in order to be assembled with and affixed to corresponding elements of adjacent units in a vertical, lateral or longitudinal arrangement.

These same assembly and anchoring elements 37 located at the bottom front and back corners of a unit may be used to anchor floor level passenger units to the structure which comprises the deck or floor 75 of the aircraft passenger cabin.

Additionally, anchoring and assembly elements located at the top back corners of a unit may preferably be used to link the assembly of units to the structural elements located at the upper wall of the aircraft passenger cabin, providing a secondary, structurally less important anchoring, which is nevertheless useful to stabilize the assembled arrangement of units; however, elements to be used to create this link should preferably provide enough flexibility to allow for a certain deformation margin for the structure of the passenger cabin. The main structural load is supported by the anchoring to the floor or deck of the passenger cabin and by the assembly and structural elements of the units themselves, as assembled into an arrangement and structural system.

The described special reinforced top panels and front side panels also comprise anchoring and assembly elements necessary to complete the anchoring and assembly of units arrangement.

The passenger units 20 are essentially of orthogonal shape. For efficient use of space, they are longer in the longitudinal direction than in the lateral direction. In a preferred embodiment of the invention comprising single or double-occupancy units, the passenger units 20 have the necessary length, width and height dimensions to accommodate one or two passengers, respectively, sitting with their legs outstretched forward or reclined to a completely horizontal position. Suitable dimensions of a single-occupancy unit are a length in the range from about 175 to about 210 cm, lateral width in the range from about 48 to about 64, and height in the range from about 84 to about 150 cm. Suitable dimensions of a double-occupancy unit are a length in the range from about 175 to about 210 cm, lateral width in the range from about 96 to about 128, and height in the range from about 84 to about 150 cm. In a preferred embodiment of the invention the dimensions (length-width-height) are 190 cm by 60 cm by 96 cm for a single-occupancy unit, and 190 cm by 120 cm by 96 cm for a double-occupancy unit. For business class units, in a preferred embodiment, the height dimension is preferably 145 cm, and the height range is about 122 cm to about 150 cm. These dimensions may be modified as desired to balance the competing factors of space efficiency and passenger comfort.

Figure 2:
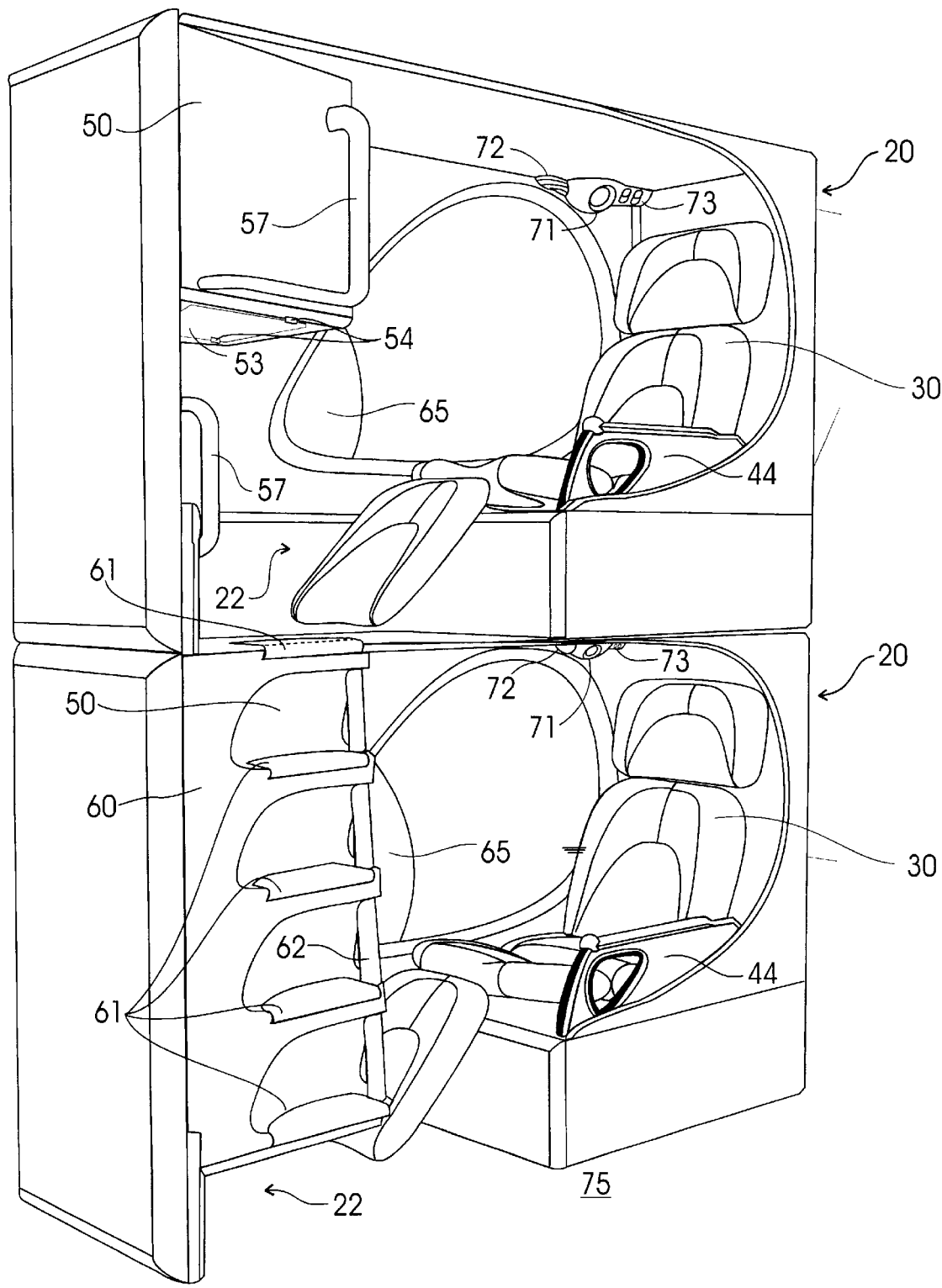
FIG. 2 is a perspective view of business class modular single passenger units arranged in two levels.
Figure 3A:
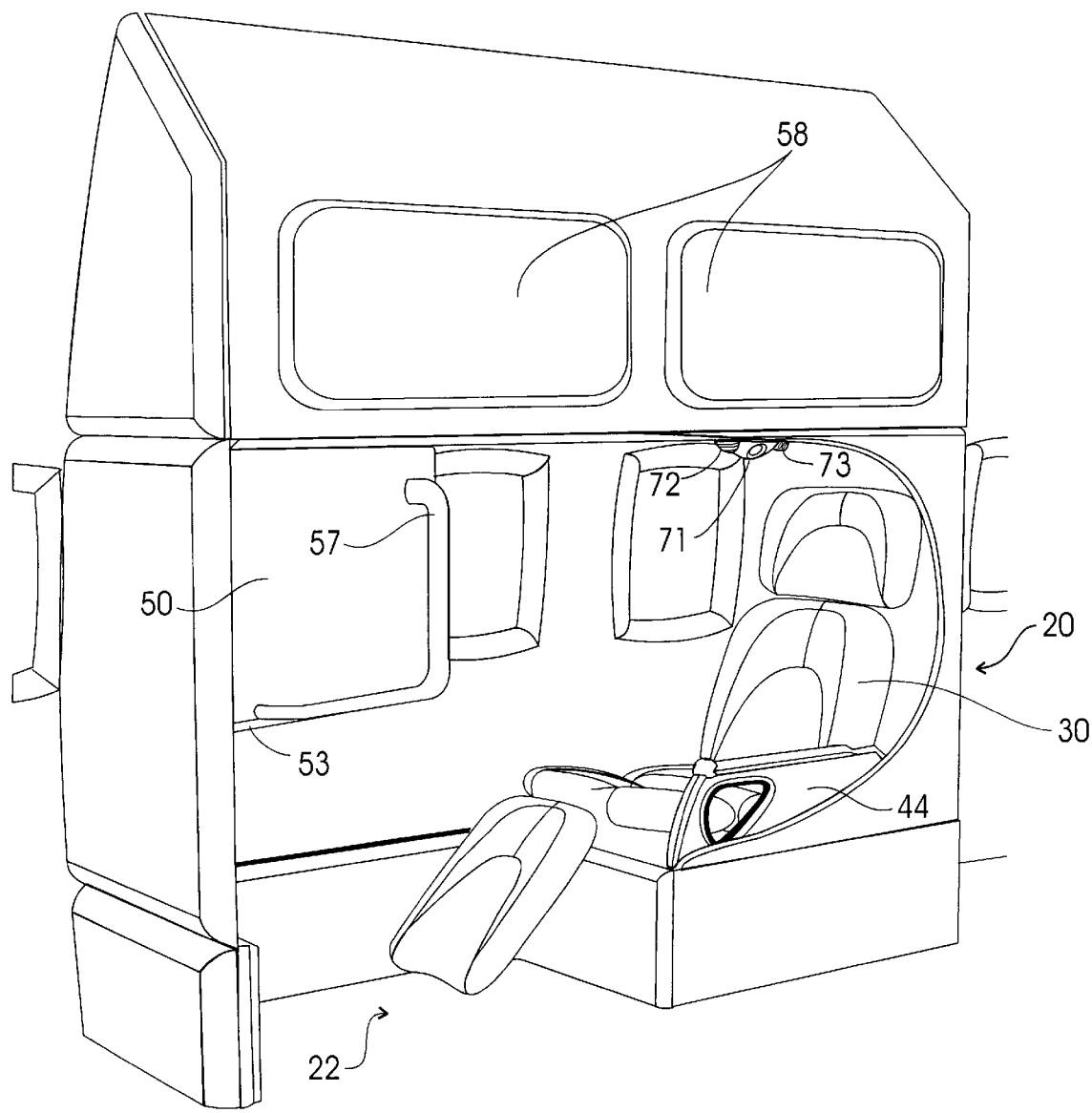
FIGS. 3a and 3b are, respectively, a perspective view of a tourist or business class modular single passenger unit, and a perspective view of a series of such passenger units, positioned at a lateral end of cabin, with extra storage space above units (preferential passenger units for the handicapped).
Figure 3B:
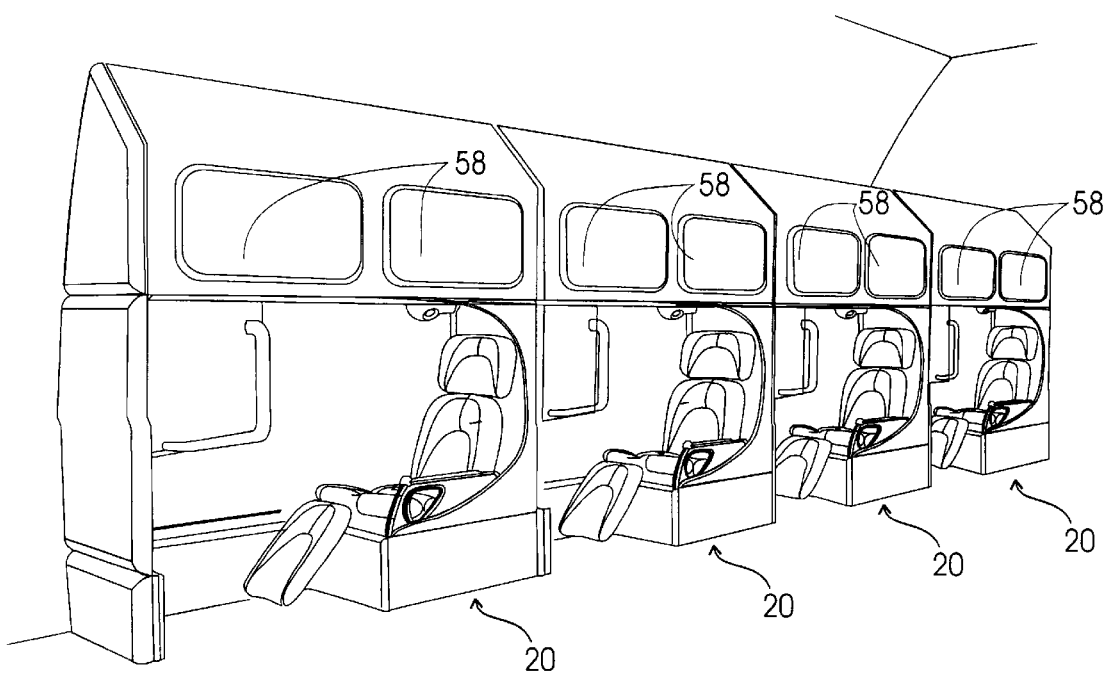
Figure 4:
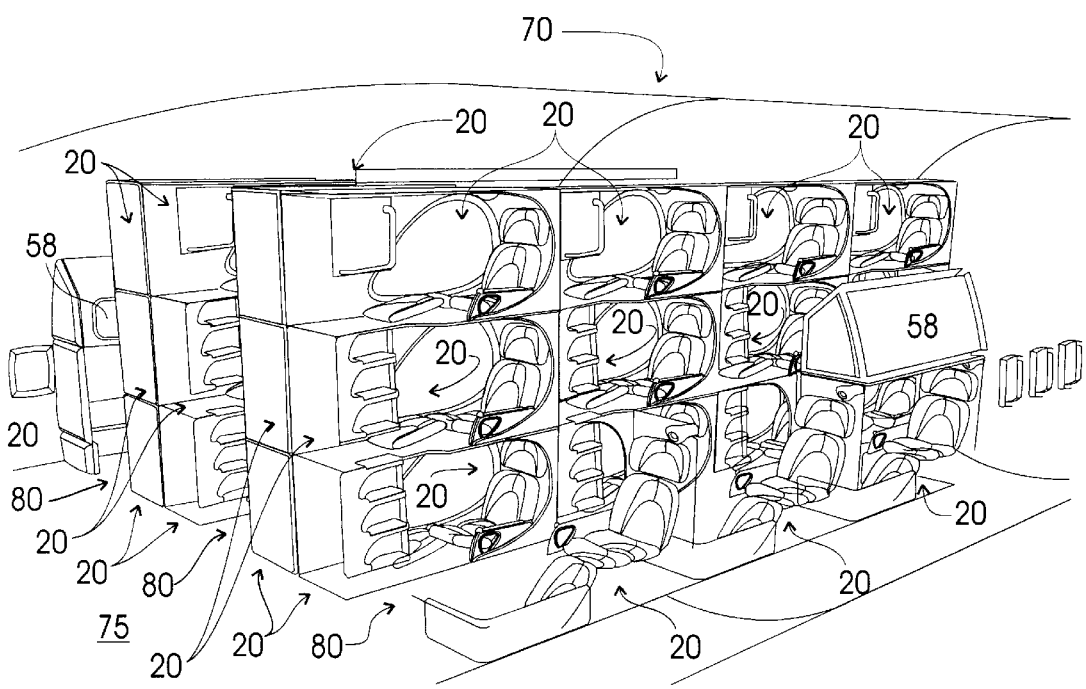
FIG. 4 is a perspective, cross sectional view of an arrangement of tourist class modular single-occupancy passenger units to form a convertible sleeper passenger cabin system inside a wide-body aircraft passenger cabin.

These modular passenger units 20 are designed to be firmly assembled in vertical sets as shown, for example, in FIGS. 1a, 1b and 2, and horizontal sets as shown, for example, in FIGS. 3a and 3b, with other like units. The units 20 may be anchored to the floor 75 of the passenger cabin 70 area of an aircraft, in order to form a convertible sleeper passenger cabin system, as shown in FIG. 4, for a wide-body aircraft. The system is constructed of structurally strong, light-weight arrangements of one, two or three levels of modular passenger units 20 assembled above each other and in rows arranged around aisle configurations.

The modular passenger units 20 of different dimensions, as described above, are made for single occupancy (FIGS. 1a, 5a, 6a, 7a) and for double occupancy (FIGS. 1b, 5b, 6b, 7b).

Double occupancy modular passenger units 20 present two independently controlled seat-bed elements 30 set alongside each other, as well as a hand baggage bin unit 50 of larger dimension than in the single-occupancy units, and two separate service tables 53.

Figure 9A:
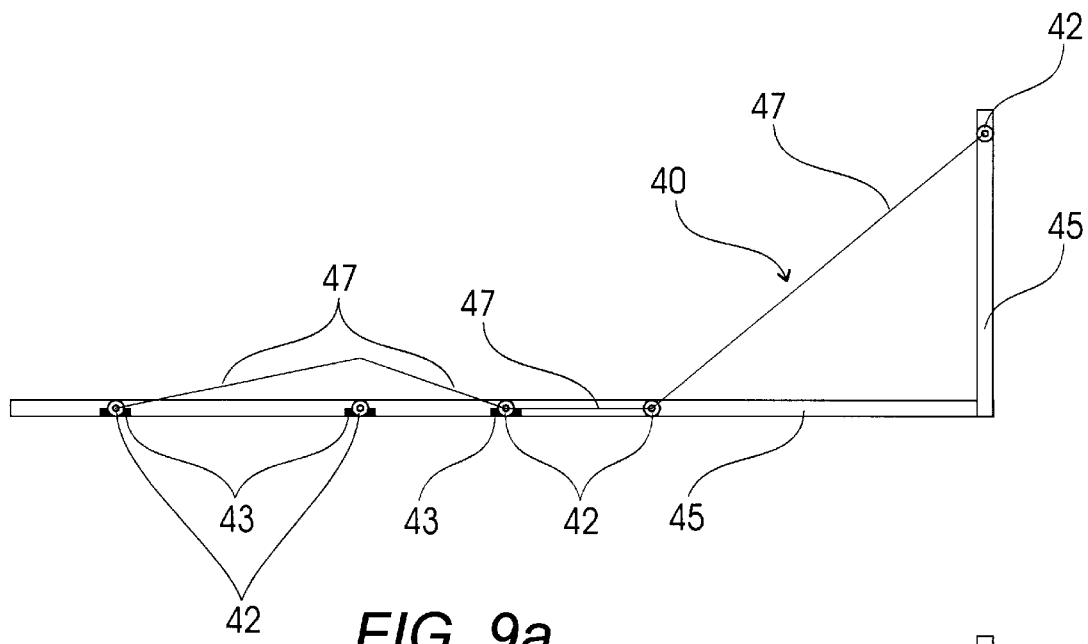
FIGS. 9a and 9b are side elevation views of a jointed frame structure device with parallel sets of rollers and sliders mounted on sets of parallel, vertical and horizontal sliding rails and guides, (a) showing an intermediate back reclining (seat) position with leg rests elevated for leg support; and (b) showing a horizontal 180° angle supine (sleeping) bed position.
Figure 9B:
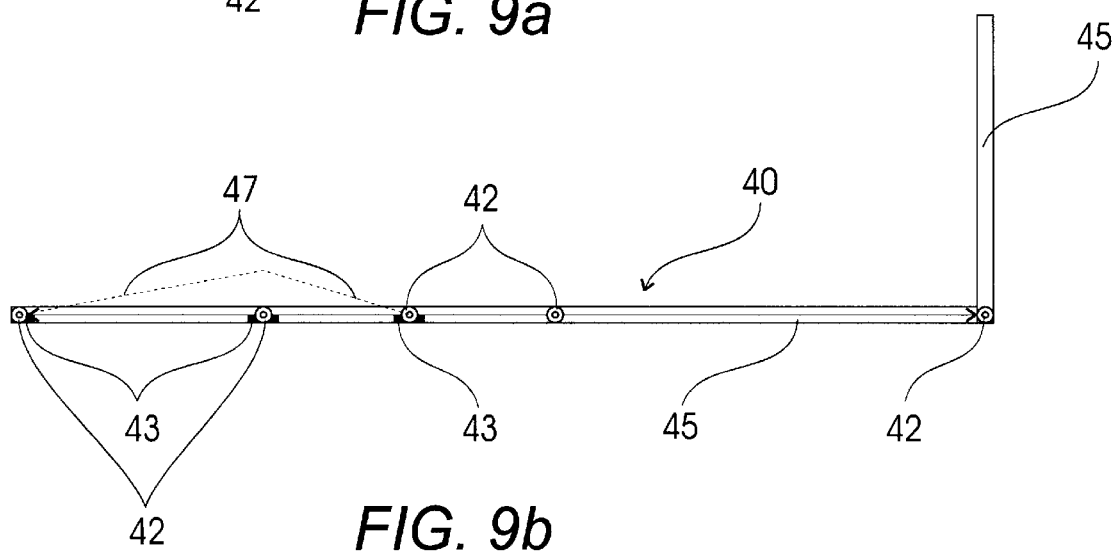
Figure 11:
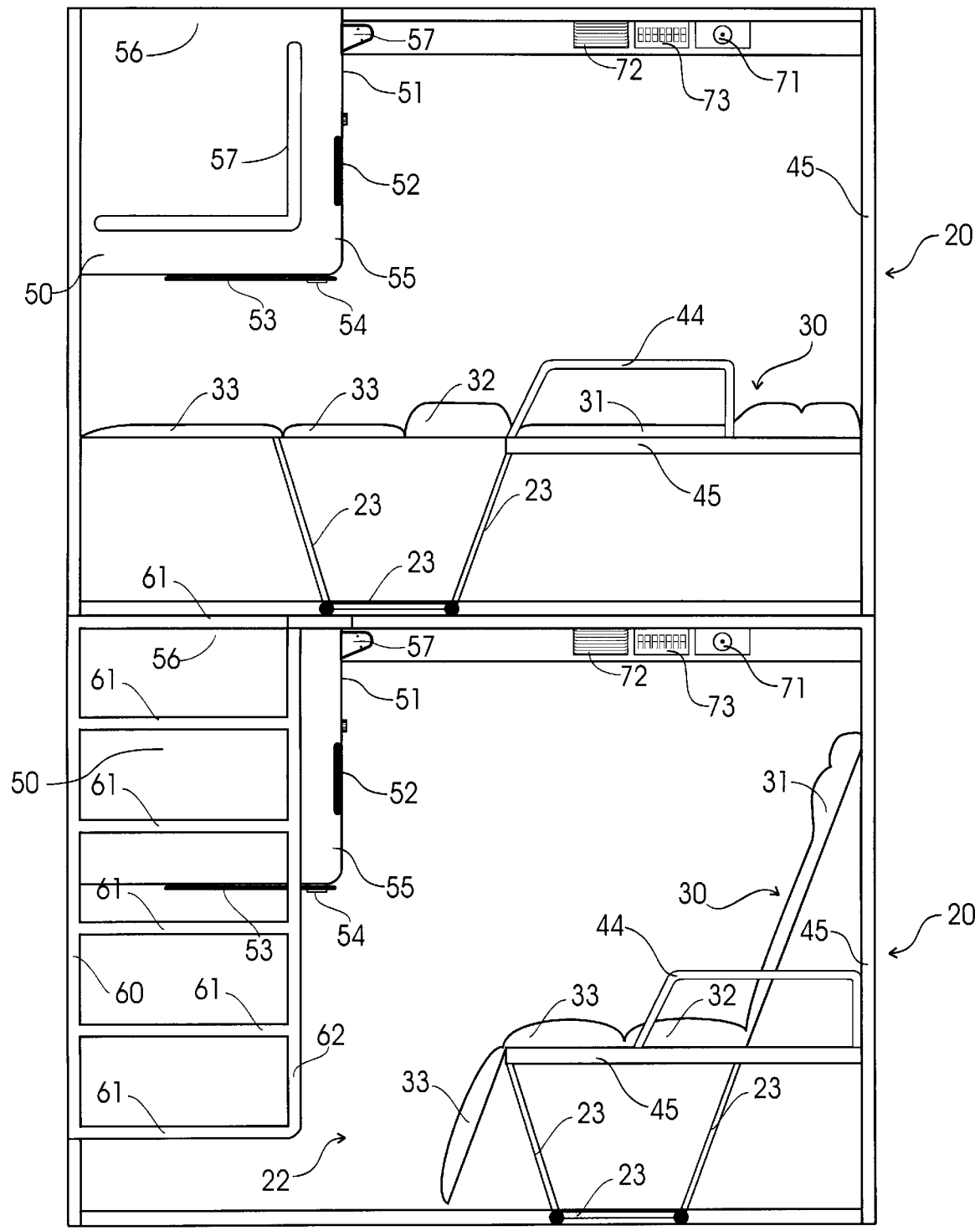
FIG. 11 is a side elevation view of two business class modular, single-occupancy passenger units arranged in two levels, for a business class convertible sleeper cabin, showing extra foot-space and larger height dimension of business class units, relative to tourist class unit, and a sliding structure for seat element of seat-bed. Spring actioned mechanism to lift leg rest is not shown.

The modular passenger units 20 are also made for tourist class cabins (see, for example, FIGS. 1a, 1b), and for business class cabins (see, for example, FIGS. 2, 11). Business class modular passenger units 20 preferably present a larger vertical dimension (height) in order to offer extra foot space 22 which allows passengers to place their feet down in a normal sitting position. Additional sliding base structure device 23 designed to support seat cushion 32 and leg rests 33 described later, is shown in FIG. 11. The leg rest 33 may be adjusted by any suitable means, for example by a spring powered mechanism (not shown) to lift and lower the free end portion of leg rest 33. Leg rests 33 may also be adjusted as indicated in FIG. 5b and 9a and by dotted line in FIG. 9b, by means of pneumatic or mechanic device (not shown).

Each modular passenger unit 20 has at least one seat-bed element 30, (FIGS. 5, 6, 7, 10 and 11), formed by a back support 31, seat cushion 32 and leg rest 33. The seat-bed element is supported by a jointed frame device 40, FIGS. 6, 8, 9 and 10, comprised of sets of joints 41, rollers 42 and sliders 43 which allow frame elements 47 to be firmly mounted with sliding movement, on a set of parallel, vertical and horizontal, sliding rails 45 (FIGS. 8, 9) and a set of slider guides 46 (FIG. 7, 8). All these combined elements form a "sliding fold-out" motion system which allows the passenger to adjust seat-bed 30 to any position from sitting to completely, horizontally reclined, aided by adjusting means, for example, mechanical, electromechanical or pneumatic power elements (not shown).

Figure 5A:
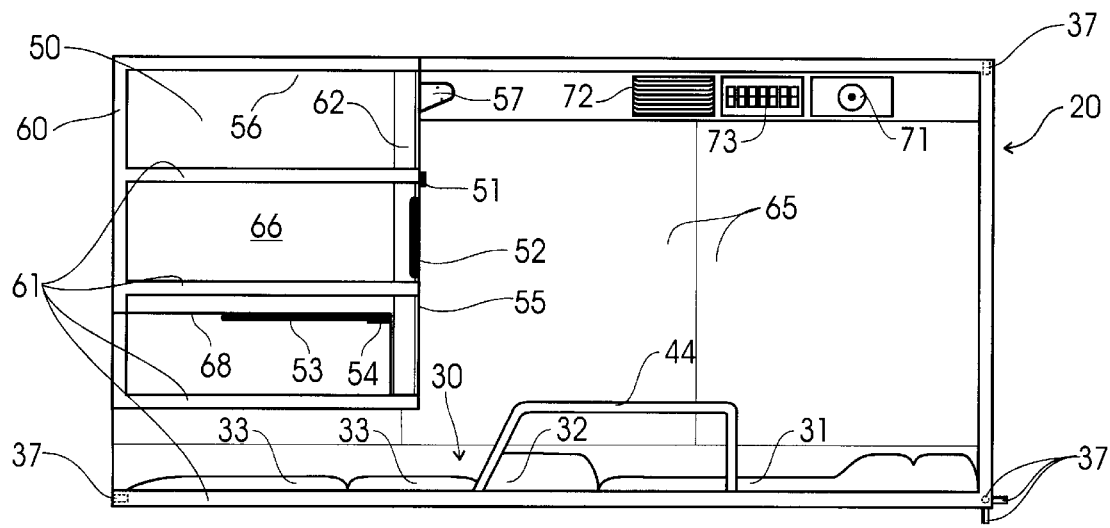
FIGS. 5a and 5b are side elevation views of (a) a modular passenger unit showing a sleeper arrangement, and of (b) a modular passenger unit showing a seated arrangement for tourist class convertible sleeper cabin.
Figure 5B:
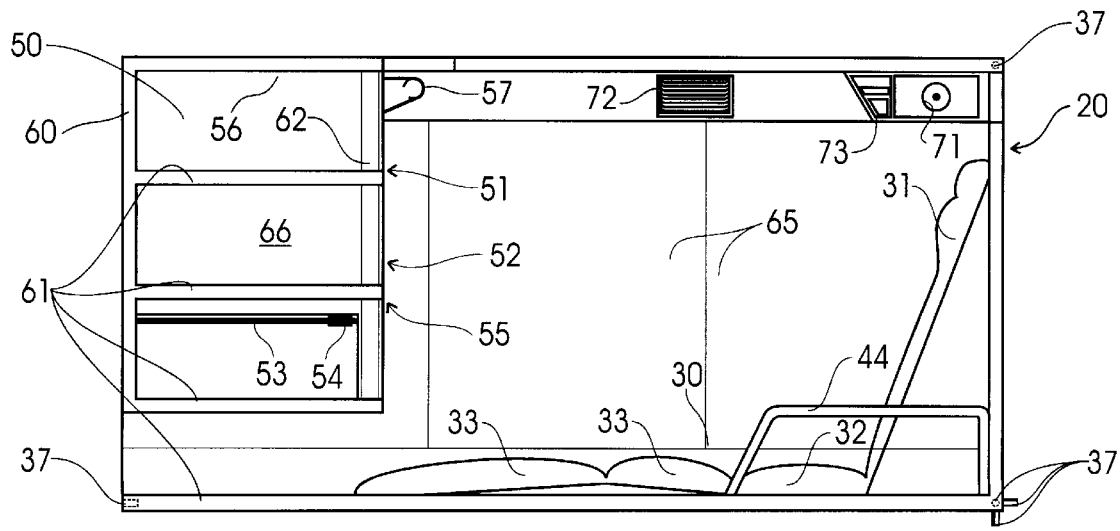
Figure 6A:
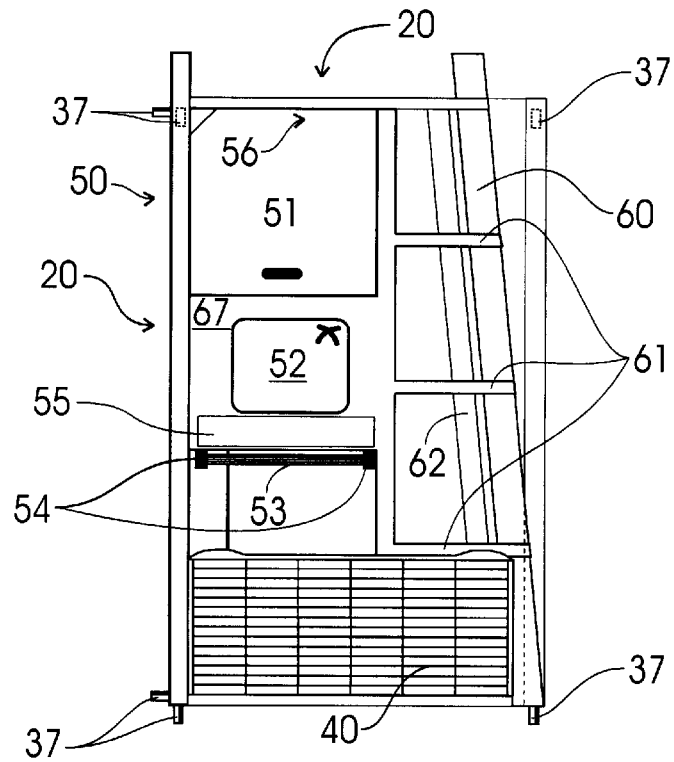
FIGS. 6a and 6b are elevation views of (a) a modular single-occupancy passenger unit and of (b) a modular double-occupancy passenger unit for tourist class convertible sleeper cabin.
Figure 6B:
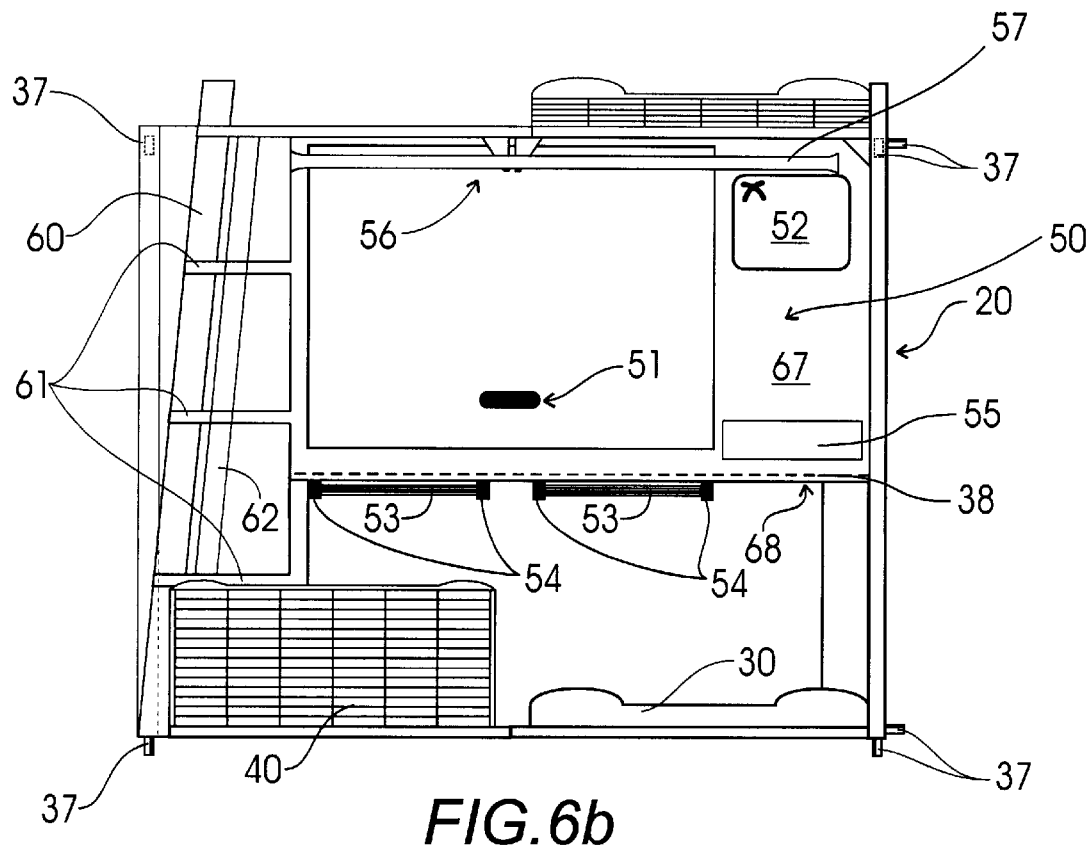
Figure 7A:
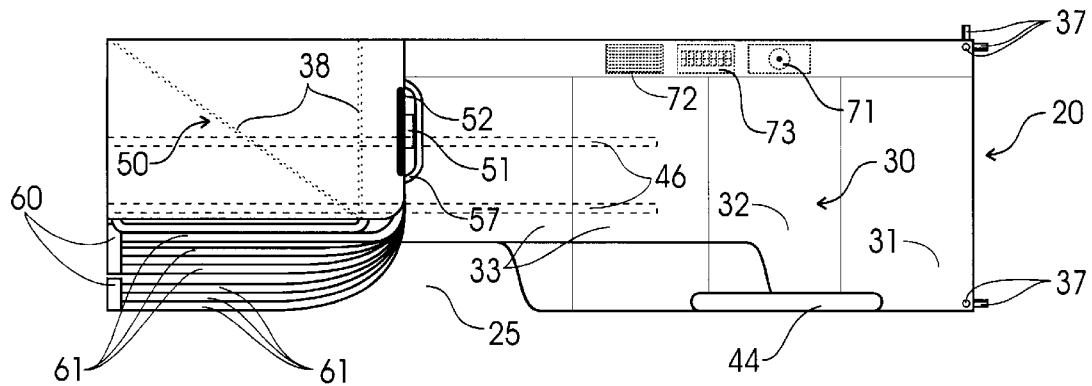
FIGS. 7a and 7b is are top plan views of (a) a modular single-occupancy passenger unit and of (b) a modular double-occupancy passenger unit for tourist class convertible sleeper cabin.
Figure 7B:
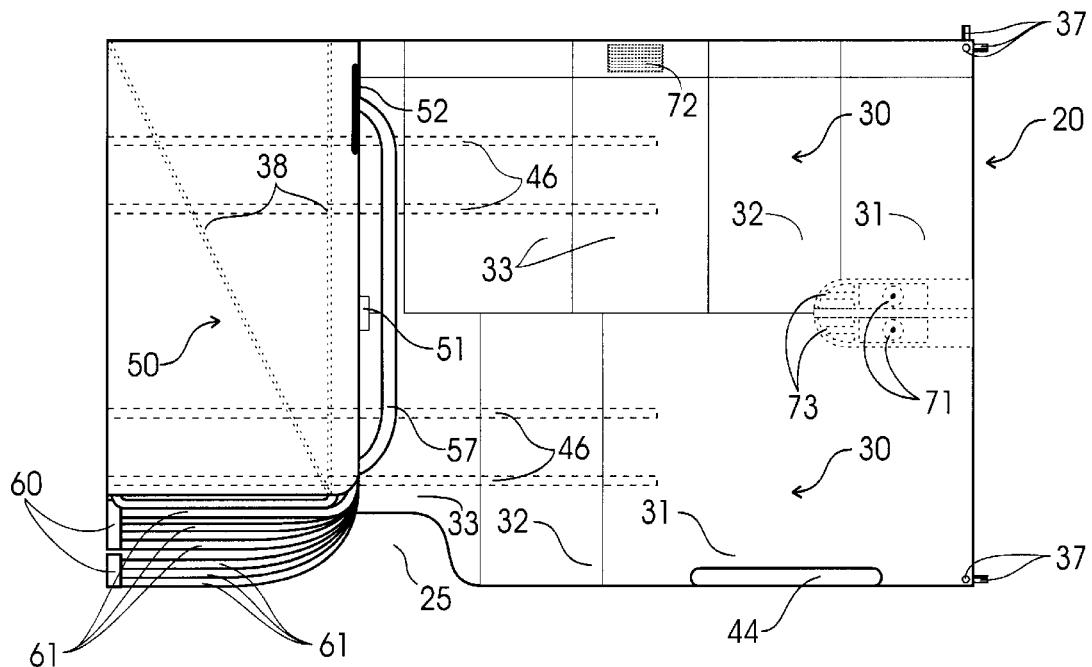

An arm rest element 44 (FIGS. 5, 7) is preferably linked to the jointed frame device 40, and thereby slides along with this device to become a safety rail when seat-bed 30 is set at the bed position as in FIG. 5a.

Seat-beds 30 of single-occupancy modular passenger units 20, and outer seat-beds 30 of double-occupancy modular passenger units 20 present narrow foot-end sections in order to create niche 25, FIG. 7, which allows easier passenger access into the unit by accommodating the motion of a passenger when entering the unit from the floor or from the ladder element 60.

The jointed frame device 40 is comprised of four frame-like structures 47 as described above, each frame corresponding to one of four sections of the padded seat-bed elements. Said frame structures are preferably made of a light-weight, strong engineering plastic material which may be either solid or formed as a honeycomb or lattice structure.

The four frames are connected by means of three pivoting joints formed with metal rods 41 which at the same time serve as shafts to support conventional ball bearings 42 at both ends of each rod, which are further assembled into the set of parallel U-section metal sliding rails 45 integrated in a horizontal position to the bottom panel of the passenger unit. A fourth assembly of rod and bearings is affixed to the outer end of the frame corresponding to the end leg rest section 33 of the seat-bed device and is also assembled into the same set of parallel U-section horizontal sliding rails.

A fifth assembly of rod and bearings is affixed to the outer end of the frame corresponding to the back support section 31 of the seat-bed device and further assembled into the set of parallel U-section metal sliding rails 45 integrated in a vertical position to the sides of the back panel of the passenger unit.

Figure 8A:
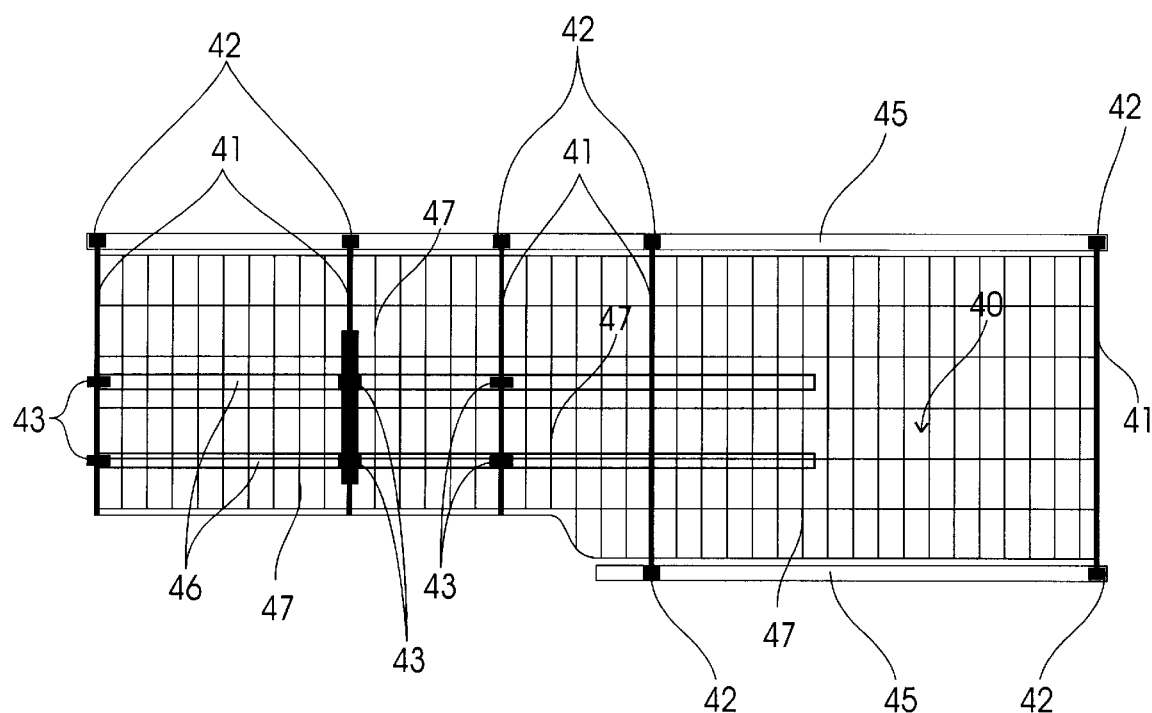
FIGS. 8a and 8b are top plan views of a jointed-frame structure device with parallel sets of rollers and sliders which are mounted on sets of parallel, vertical and horizontal sliding rails and guides (a) for single unit seat-bed and for double unit outside seat-bed and (b) for double unit inside seat-bed.
Figure 8B:
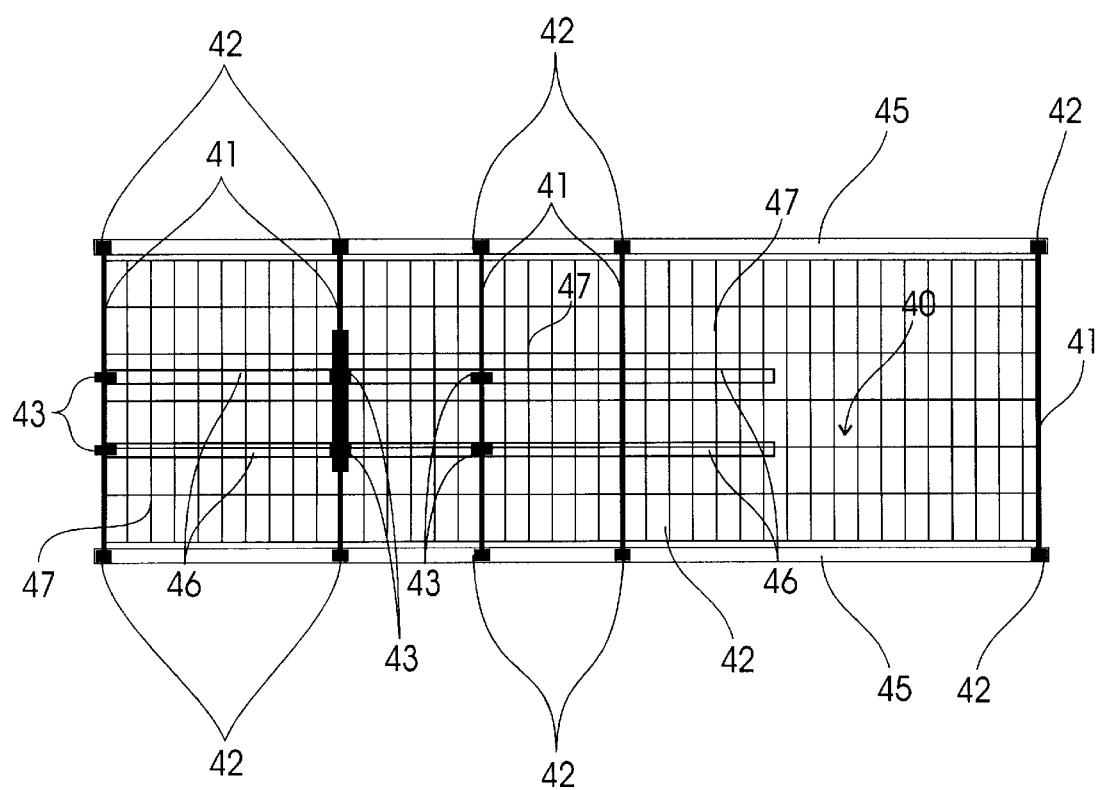
Figure 10A:
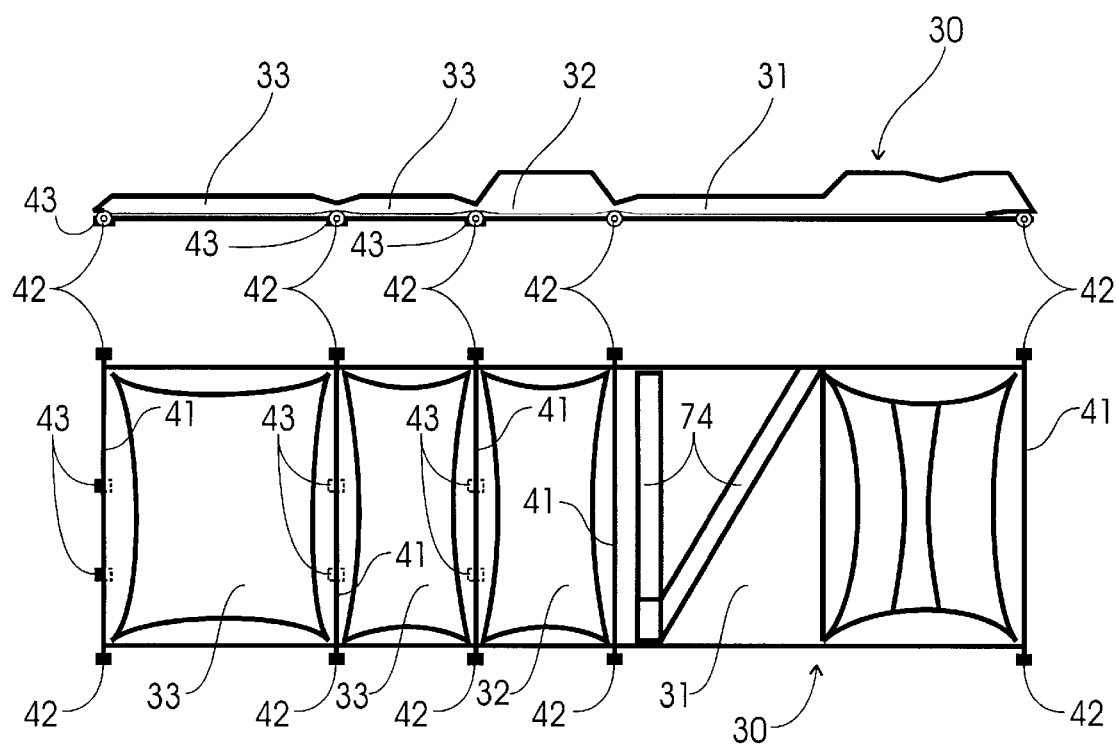
FIGS. 10a and 10b are each a side elevation view and a top plan view of padded convertible seat-bed elements, showing three-point seat belt, wherein the entire assembly is supported by jointed-frame structure, rollers and sliders; (a) shows a double occupancy unit inside seat-bed; and (b) shows single-occupancy unit, or double-occupancy unit outside seat-bed.
Figure 10B:
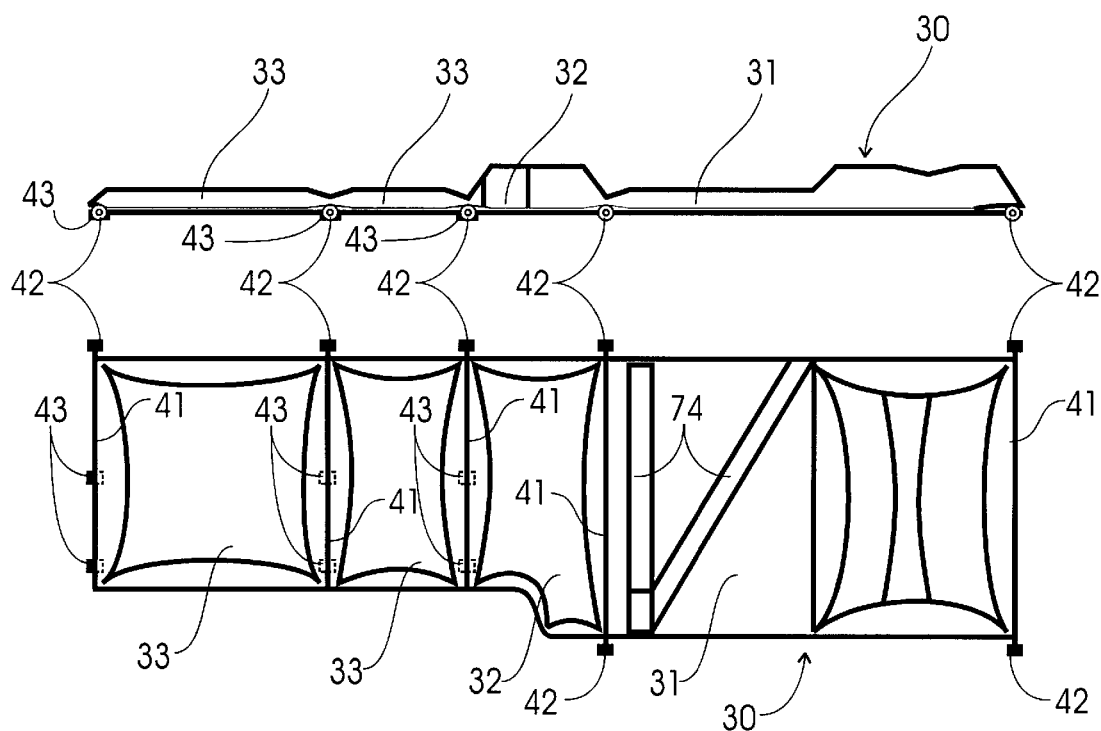

The three rods which are connected to the frames corresponding to the two leg rest sections 33 of the seat bed element comprise each a set of two high strength plastic material sliders 43, which are positioned facing down and further connected to two parallel metal slider guide rails 46 which are integrated to the bottom panel of the passenger unit and which run longitudinally to the seat-bed element directly under the jointed frame device; the slider and slider rails assembly holds the jointed-frame and seat-bed assembly securely in place, particularly in the cases of single-occupancy unit seat-bed elements and of double-occupancy unit outer seat-bed elements, where from two to three outer bearings need to be eliminated, depending on design details, as shown in FIG. 8a and 10b, due to the narrow foot-end designed of such seat-bed elements.

Each of the four padded sections which comprise the seat-bed element is made of soft, flexible, synthetic material finished with conventional fabric covers and is directly mounted by means of conventional fastening elements to its corresponding jointed-frame section. This allows the seat-bed elements seat cushion and leg rest sections to move forward and backward upon the jointed-frame supports, as the back support section to which they are connected slides horizontally forward and backward on its inner end and vertically, downwards or upward on its outer end, thus creating a variety of possible positions for said back support section and the sections connected to it; from an upright sitting position to the horizontal bed position. Alternate conventional means for powering these elements arc also described elsewhere above.

The arm-rest element is mounted on an outer side end of the jointed-frame in a section corresponding to the seat-cushion section of the seat-bed, and the arm-rest element moves along with this portion of the jointed-frame to become a safety rail when seat-bed is set at the bed mode.

Seat-bed padded leg rest sections may be lifted slightly at the area surrounding the joint between the two leg rest sections preferably, but not limited to, by means of a pneumatic device which swells this area in order to provide higher support for the passenger's legs at the back of the knees. Other alternative means may include conventional spring mechanisms to lift the padded leg rest sections at that point.

Business class modular passenger units differ from tourist class units, as described in prior sections in their larger vertical dimensions and additional leg room which permits passenger to place their legs and feet down in a conventional sitting position.

A sliding stricture 23 (FIG. 11) mounted on ball bearings and further mounted on metal guide rails which hold it securely in place, is used to support the seat-cushion and inner leg rest sections of the seat-bed.

The outer leg rest section in this type of unit is lifted and lowered by means of a conventional spring and lever mechanism not shown, which may be powered manually or aided by conventional electromechanical elements.

A hand baggage bin unit 50 (FIGS. 1a, 1b, 2, 3a, 3b, 5, 6, 7, 11) is preferably integrated into each modular passenger unit 20. Each hand baggage bin unit 50 presents a hatch 51 for access to the bin unit 50 and a video monitor 52 on a front panel of the bin unit 50. Integrated to this unit are also the sliding/detachable service table or tables 53 and service table sliding guides 54. An oxygen mask compartment 55 and life vest compartment 56 (life vest not shown) are placed inside the hand baggage bin unit 50; preferably the life vest is attached to the bin unit top panel. Hand grips 57 are located strategically, attached to the hand baggage unit 50.

Fixed integrated ladders 60, FIGS. 1a, 1b, 2, 5, 6, 7, and 11 are located on the outside lateral panel of the hand baggage bin units 50 of all bottom and middle level modular passenger units 20. These ladders 60 present a horizontally curved, tilted, "wrap-around" design of the steps or rungs 61, with conveniently located vertical hand grips 62, which facilitate passenger access into the modular passenger unit 20. The fixed integrated ladders 60 preferably have no vertical elements between the steps 61 located at the bottommost area of each modular passenger unit 20, in order to allow unobstructed movement of passengers' feet and legs when accessing or leaving passenger unit 20.

Hand baggage bin units 50 and fixed integrated ladders 60 are built and reinforced in a similar manner as passenger units. They are preferably made of a light-weight, strong and rigid engineering plastic structural material, and metal reinforcements 38 (FIGS. 6b and 7b) which provide structural strength and rigidity at critical stress points.

The hand baggage unit 50 comprises one lateral panel 66 (FIG. 5a), one front panel 67 and one bottom panel 68; the complementing panels are formed by described front and lateral panels of the passenger unit to which the hand baggage bin unit 50 is affixed by means of conventional fastening elements, as well as by the bottom panel of the adjacent passenger unit located above the assembly, to which said unit is also affixed. For a top passenger unit with no adjacent unit above, the top panel of the hand baggage bin may be formed of a separate unit affixed to the hand baggage bin, or it may be formed by a portion of a top panel of the entire unit.

The fixed integrated ladder is described above and may either be built as an integral part of the hand baggage bin unit or as a separate element to be assembled by means of conventional fastening elements into the lateral panel 66 of said unit 50 and affixed also to the metal reinforcement elements of the passenger units which are adjacent to said ladder.

Hand holds, service table, and hatch described above, are also made of structural plastic materials and metallic reinforcements where this is necessary, as is the case of hand holds; these elements are also assembled to the hand baggage bin unit and integrated ladder by means of conventional fastening elements.

Sliding "privacy" panels 65 (FIG. 5) slide out from a narrow space between two adjacent hand baggage bin units 50 to allow more privacy for passengers rest. Privacy panels 65 slide back and hide completely in order to avoid obstruction hazards and to create an open, roomy environment throughout the passenger cabin 70 when in an open configuration. In one embodiment of the invention, each of two longitudinally adjacent passenger units 20 may have individual privacy panels 65 situated in the wall portion between the units. In this embodiment, each passenger may have control over the privacy panel 65 of the passenger's own passenger unit 20.

Additional safety and comfort features are conveniently located inside each modular passenger unit 20. These features may include, by way of illustration and not of limitation, lighting element(s) 71 (FIGS. 5, 6, 7 and 11), ventilation outlets 72, headphone jack, audio-video controls, lighting controls and seat-bed controls 73, and a safety belt or harness, such as for example a three-point adjustable seat belt 74 (FIG. 10b).

Electrical power cables, communication cable, and ventilation air supply ducts are preferably lodged inside triangular section utility ducts, which may run, for example, vertically along the inner foot end corner of each modular passenger unit, and which are vertically aligned in vertically arranged units. These ducts may run horizontally along the inner upper corner of each passenger unit and may be horizontally aligned in horizontally arranged units providing the means for interconnecting electrical, communications and air supply elements through unit arrangements. Electrical, communication and ventilation outlets are generally located on the exterior walls of such horizontal ducts.

In a preferred embodiment, the convertible sleeper passenger cabin 70 arrangements design presents three longitudinal aisles 80 (FIGS. 4, 12a–b, 13a–b) which provide direct access to each modular passenger unit 20. Other configurations of the passenger units are within the scope of the invention and may be determined by one skilled in the art to present an efficient and effective placement of passenger units of the invention in an aircraft passenger cabin.

The modular passenger units 20 are preferably arranged longitudinally with respect to the passenger cabin 70. Middle and upper level modular passenger units 20 are accessed by means of fixed integrated ladders 60 as described above.

Preferential modular passenger units 20 shown in FIG. 3 may be located at the side ends of the passenger cabin 70 (FIGS. 4, 12a–b, 13a–b) next to the cabin windows. These preferential units intended to accommodate senior passengers and those with physical disabilities are situated on the floor level, have a standard seat height in the range from about 38 to about 45 cm above the floor level, and present the larger vertical dimension and larger foot space 22 of business class modular passenger units 20. Extra hand baggage storage bins 58 may be located above preferential modular passenger units 20, at the side ends of the passenger cabin 70.

Figure 12A:
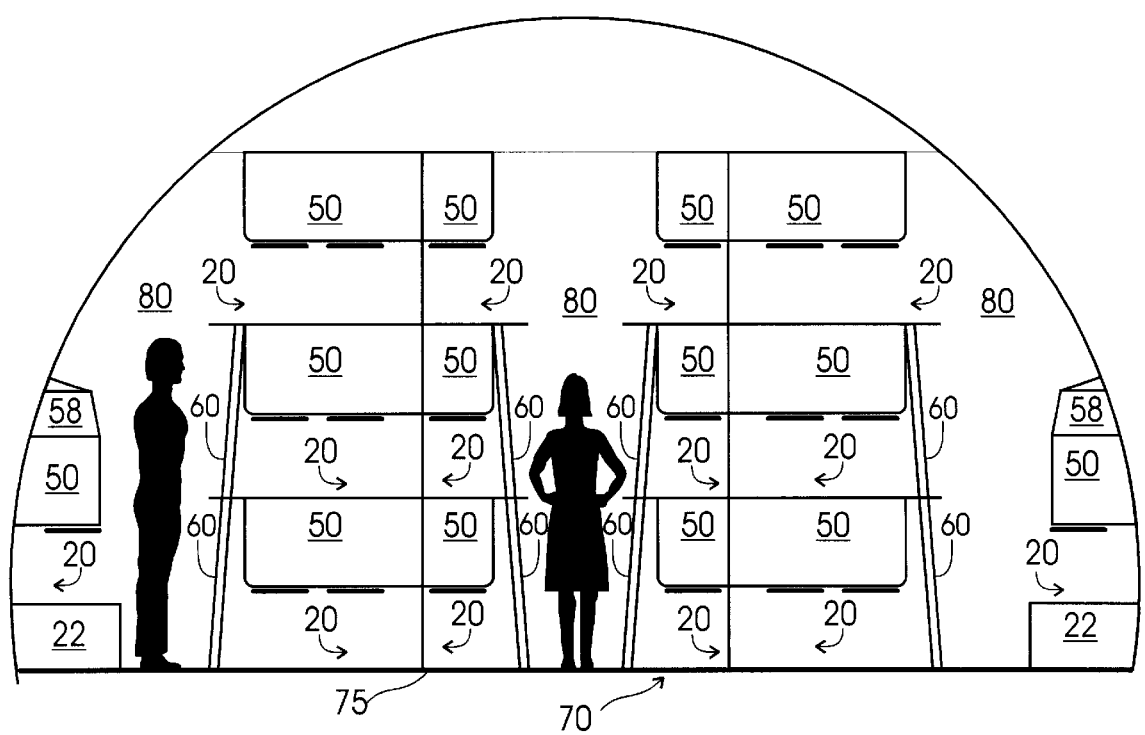
FIGS. 12a and 12b are cross-section elevational views of (a) tourist class and (b) business class convertible sleeper cabin system arrangements for passenger cabin of a wide-body aircraft, e.g., a Boeing 747 type aircraft.
Figure 12B:
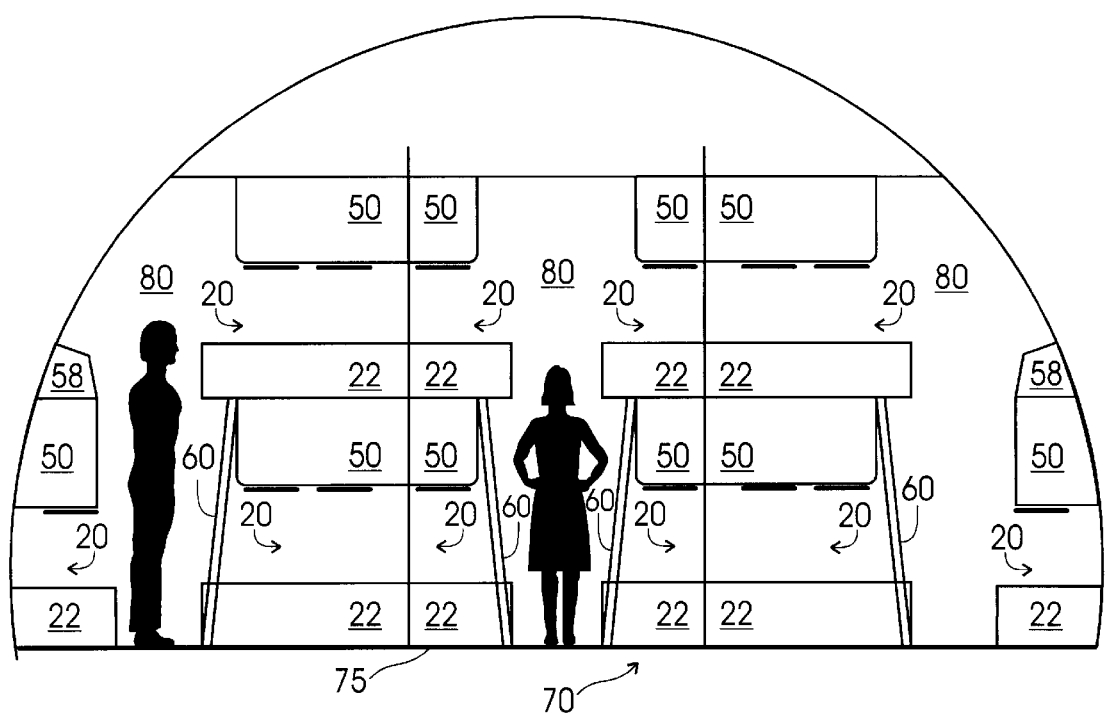
Figure 13A:
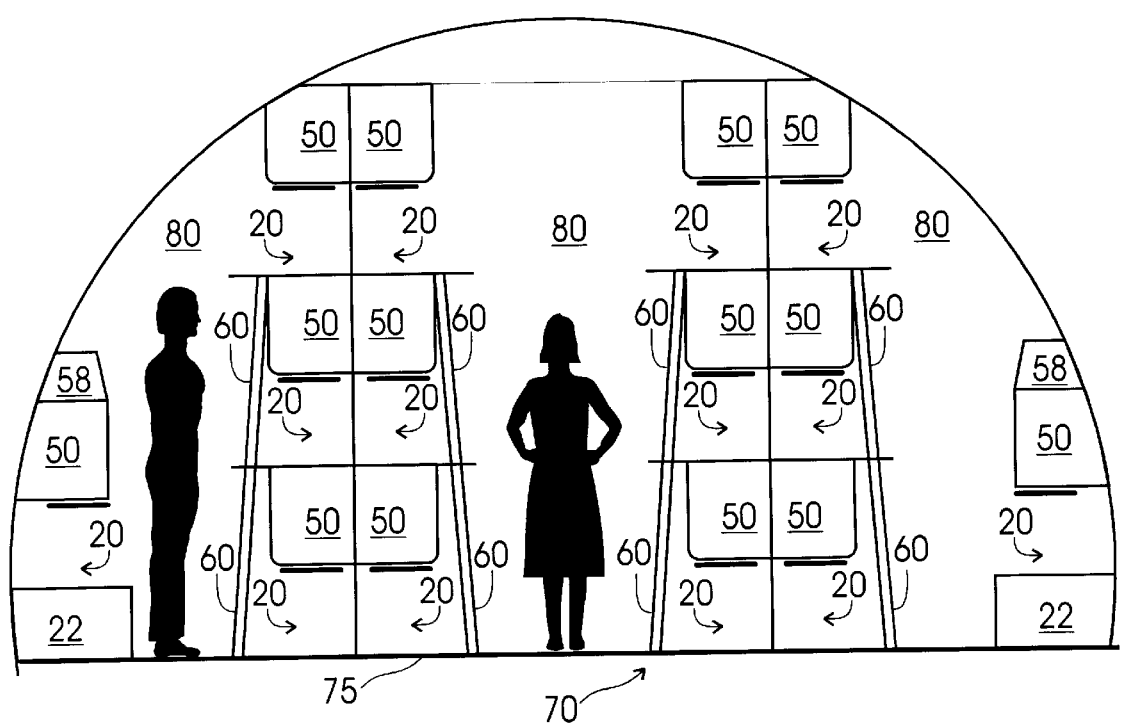
FIGS. 13a and 13b are cross-section elevational views of (a) tourist class and (b) business class convertible sleeper cabin system arrangements for passenger cabin of an alternative wide-body aircraft; e.g., Boeing 767, McDonell-Douglass DC-10, Airbus 300 type aircraft.
Figure 13B:
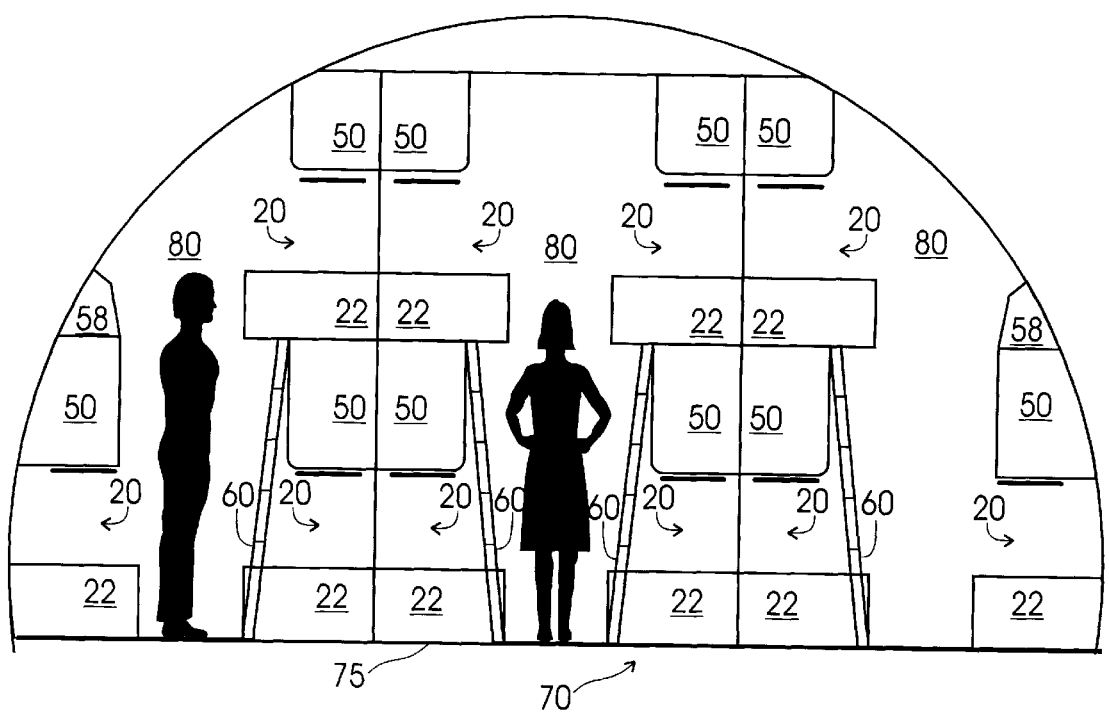

Convertible sleeper cabin 70 arrangements are provided, by way of example and not of limitation, for aircraft of the following types:

Boeing 747, tourist class passenger cabin, FIG. 12a, and business class passenger cabin FIG. 12b; and Boeing 767, McDonnell-Douglas DC-10, Airbus-300, tourist class passenger cabin, FIG. 13a, and business class passenger cabin, FIG. 13b.

Except as noted herein, the construction, assembly, anchoring and operation of business class modular passenger units and cabin arrangements are based on the same principles, concepts and procedures as described for tourist class modular passenger units and cabin arrangements.

The invention comprises passenger accommodations, and aircraft comprising such accommodation, wherein the passenger units are of modular, monocoque construction. Each passenger unit contains one or more independent convertible seat-bed units. The passenger units are positionable upon one another to form arrangements suitable to fit all types of wide-body aircraft in operation. These units can be securely, easily and rapidly affixed to the structure of an aircraft to replace standard seating systems on new or older aircraft.

The passenger unit modules may be made for single-occupancy or for double-occupancy, with independently convertible individual seat-beds. For tourist class, it is intended that the units be arranged vertically in three levels, while for business class the larger modules would be arranged vertically in two levels. The larger business class accommodations provide extra leg room and foot space.

The passenger unit modules are constructed with fixed ladders integrated to every vertical set of two or three modules, as may be the case, which present a "wrap around", tilted step design. Preferably, the ladder has vertical elements open, or interrupted, at the bottom portion of each passenger unit in such a manner as not to obstruct passengers' legs when entering or leaving the unit. The ladders provide direct means for entering or leaving modules of middle or upper levels at any time without crew assistance being necessary.

The seat-bed units of the passenger module are a convertible and adjustable device, which may be configured or adjusted by the passenger (without assistance from the crew) by means of jointed structural frames which operate using a "sliding fold-out" system with sets of rollers and sliders mounted parallel to the sides and bottom of the frames, and which are in turn mounted on sets of parallel, vertical and horizontal sliding rails and guides.

The adjustment mechanism for the seat-bed may be manually driven, but is preferrably powered by electromechanical and/or pneumatic means. The jointed frames fold in and out, providing support for the padded elements which form the seat-bed parts of back support, seat cushion and leg rests. Each seat-bed can be controlled independently and individually by the passenger without any assistance necessary from crew members to adjust the back support and leg rests to convert it into a seat or a bed, as desired. The seat-bed includes a restraint mechanism, preferably an adjustable three-point seat belt. The seat-bed also includes an arm rest device which slides partially along with jointed frame and becomes a safety rail when the seat-bed is set in the bed position.

There are baggage bin units, which are closed compartments for storage, which are integrated within each passenger unit module utilizing the available space above the passenger's feet and legs and which is set in front of the passenger's upper body when in sitting position, at a safe and comfortable distance from the passenger's head. Integrated in the front panel of the baggage bin unit there may be a video monitor. In addition, a sliding and detachable service table may be located underneath the bottom panel of the baggage bin. Also contained in the hand baggage bin, or supported by this element, may be an emergency oxygen mask and life vest. One or more strategically located hand grip may be incorporated in or affixed to the baggage bin portion of the passenger unit.

For enhanced passenger privacy, the passenger unit may be equipped with a sliding "privacy" panel made of a light-weight, rigid material. These panels are used to cover the opening between adjacent units, and preferably slide out from behind the inside lateral panel of each hand baggage bin unit to provide privacy from the adjacent module. The privacy panels slide back and hide completely between hand baggage bin units so as not to represent an obstruction or safety hazard.

The passenger unit further comprises other safety and comfort features which are integrated into the unit. For example, at the back and/or lateral upper corners of double or single-occupancy passenger units, there may be the following features: individual reading light or other lighting device, ventilation outlet, audio-video controls, seat-bed controls, flight attendant call button, and head phones jack. The audio-visual controls would control, inter alia, the video monitor which may be built into a portion of the front surface of the baggage bin facing the back support of the seat-bed unit. Additionally, the unit may include features such as a telephone or telephone connection, an electrical power outlet and a computer modem outlet.

The invention further comprises an aircraft with a passenger cabin arrangement design preferably based on three longitudinal aisles, with either two or three levels of modular passenger units located at both sides of the center aisle and at the inner side of each side aisle, with one level of modular passenger units positioned at the outer side of each side aisle. Preferably, all modules are set longitudinally to the cabin and aisles and are facing forward, all units also have direct, independent access to one aisle, with middle and upper level units being reached by means of the integrated ladders described elsewhere herein. Other cabin configurations are within the scope of the invention, though the above configuration is preferred.

In one embodiment of the invention, there are passenger units located at the side ends of passenger cabin (the interior side of the exterior wall of the aircraft) which are all set at standard seat height, with extra foot space and larger vertical dimension, to be intended as preferential units for physically disabled or senior passengers. Located above these units are extra hand-baggage storage bins.

This invention is suitable to a variety of aircraft types. The Figures show convertible seat-bed sleeper cabin arrangement designs for all wide-body types of commercial aircraft, including Boeing 747, Boeing 767, McDonnell-Douglas DC-10, and Airbus 300.

The preceding description has presented in detail exemplary preferred embodiments of the invention and their application. Those skilled in the art will recognize that numerous alternatives encompassing many variations may readily be employed without departing from the scope of the present invention as set forth in the claims herein.

What is claimed is:

1. A passenger unit for an aircraft comprising at least one convertible seat-bed unit which seat-bed unit may be configured by a passenger, independent of the configuration of other seat-bed units in said passenger unit or in other passenger units of said aircraft, in a continuous series of positions from an essentially upright position to an essentially flat position, wherein said seat-bed unit, in any configuration, does not extend outside of said passenger unit.

2. The passenger unit of claim 1 wherein said seat-bed unit further comprises an arm rest device which converts to a side rail restraint when said seat-bed unit is converted from said upright position to said flat position.

3. The passenger unit of claim 1 further comprising at least one baggage bin integrally constructed within said unit.

4. The passenger unit of claim 1 further comprising a ladder element integrally constructed within said unit to facilitate passenger access into and out of vertically adjacent passenger units in said aircraft.

5. The passenger unit of claim 1 comprising two adjacent, independently adjustable seat-bed units each with an arm rest device which converts to a side rail restraint when said seat-bed element is converted from an upright position to a flat position, and further comprising two baggage bins, two sets of controls to adjust lighting and ventilation in said unit, two sets attendant call devices, and two audio headphone jacks.

6. The passenger unit of claim 1 comprising an openable and closable portion of one longitudinal wall of said unit.

7. The passenger unit of claim 6 wherein said unit comprises a retractable panel situated in said wall.

8. The passenger unit of claim 2 wherein said seat-bed unit and said arm rest device are mounted on a jointed frame device which is longitudinally movable backward and forward, such that said seat-bed unit is converted from an essentially upright position to an essentially flat position, and said arm rest device is converted to a side rail, as said jointed frame device is moved from a back position to a forward position.

9. An aircraft comprising one or more rows of said passenger units of claim 1 aligned along a longitudinal axis of said aircraft, and at least one aisle adjacent to said row.

10. The aircraft of claim 9 comprising four rows of said units and three aisles, wherein two rows are contiguous with an external wall of said aircraft, and two rows are situated along interior longitudinal axes of said aircraft.

11. The aircraft of claim 10 wherein said interior rows of passenger units each comprise two contiguous, longitudinally parallel rows of said unit, such that each unit in said interior row is adjacent to another unit is said row and shares a common wall with said adjacent unit, and there is at least one retractable panel in said wall.

12. The aircraft of claim 9 comprising longitudinal rows of passenger units, wherein said units comprise a first size unit and a second size unit, wherein said first size unit is higher and wider than said second size unit, and said first size units may be arranged vertically in one or two levels and said second size units may be arranged vertically in one, two or three levels.

13. A passenger unit for an aircraft comprising:
(a) at least one convertible seat-bed unit,
(b) at least one convertible arm rest device,
(c) at least one adjustable, three-point seat belt,
(d) at least one baggage bin integrally constructed within said passenger unit,
(e) a ladder element integrally constructed within said passenger unit to facilitate passenger access into and out of vertically adjacent passenger units in said aircraft, said ladder element of one passenger unit being vertically aligned with a ladder unit of a vertically adjacent passenger unit,
(f) at least one set of controls to adjust lighting and ventilation in said unit, attendant call devices, and audio headphone jacks, and
(g) an openable and closable portion of one longitudinal wall of said unit; wherein said seat-bed unit may be configured by a passenger, independent of the configuration of other seat-bed units in said passenger unit or in other passenger units of said aircraft, in a continuous series of positions from an essentially upright position to an essentially flat position, wherein said seat-bed unit, in any configuration, does not extend outside of said passenger unit; and said arm rest device converts to a side rail restraint when said seat-bed unit is converted from said upright position to said flat position.

* * * * *